United States Patent [19]

Fleri

[11] Patent Number: 4,724,819
[45] Date of Patent: Feb. 16, 1988

[54] CYLINDER LINER RECONDITIONING PROCESS AND CYLINDER LINER PRODUCED THEREBY

[75] Inventor: Sam Fleri, Clark's Summit, Pa.

[73] Assignee: Precision National Plating Services, Inc., Clark's Summit, Pa.

[21] Appl. No.: 6,221

[22] Filed: Jan. 23, 1987

[51] Int. Cl.⁴ .................. F02B 77/02; B23P 15/00
[52] U.S. Cl. .................. 123/668; 29/156.4 WL; 29/458; 29/527.2; 29/DIG. 19; 29/DIG. 25; 29/DIG. 39; 29/DIG. 7; 29/402.18; 123/193 C; 418/178
[58] Field of Search .................. 29/156.4 WL, 527.1, 29/527.2, 458, DIG. 7, DIG. 39, DIG. 19, DIG. 25, 402.01, 402.07, 402.18; 123/193 C, 668; 416/196, 197; 418/61 A, 178

[56] References Cited

U.S. PATENT DOCUMENTS

| 3,289,649 | 12/1966 | Lamm | 123/193 C |
| 3,878,880 | 4/1975 | Jones | 418/178 X |
| 3,888,746 | 6/1975 | Uy et al. | 29/156.4 WL |
| 3,918,137 | 11/1975 | Telang et al. | 29/156.4 WL |
| 4,039,296 | 8/1977 | Levinstein | 418/178 X |
| 4,395,442 | 7/1983 | Meise et al. | 29/156.4 WL |

FOREIGN PATENT DOCUMENTS 1152957 5/1969 United Kingdom ............... 123/668

OTHER PUBLICATIONS

Dumont, L. F., "Possible Mechanisms by which Combustion-Chamber Deposits Accumulate and Influence Knock", *SAE Quarterly Transactions*, vol. 5, No. 4, (Oct. 1951); pp. 565, 573-574.

Primary Examiner—Howard N. Goldberg
Assistant Examiner—Ronald S. Wallace
Attorney, Agent, or Firm—Fitzpatrick, Cella, Harper & Scinto

[57] ABSTRACT

The present invention relates to an apparatus and a method for finishing engine cylinder walls and reconditioning used engine cylinders. The invention also provides engine cylinders having a multilayer coating of a base layer, a steel layer and a layer of a tetrafluoroethylene fluorocarbon polymer, i.e., a "Teflon" wear surface.

18 Claims, 1 Drawing Figure

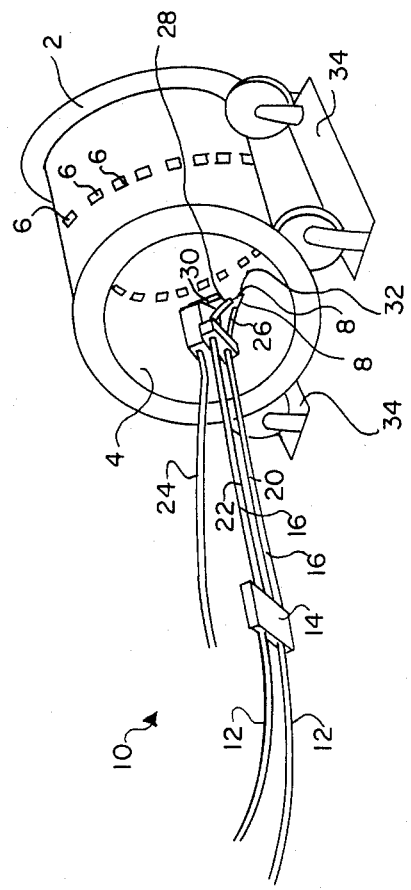

CYLINDER LINER RECONDITIONING PROCESS AND CYLINDER LINER PRODUCED THEREBY

BACKGROUND OF THE INVENTION

1. Field of the Invention

The present invention generally relates to processes for rebuilding mobile and stationary internal combustion engines. More particularly, the present invention relates to improved apparatus and methods for reconditioning diesel engine cylinder liners.

2. Brief Description of the Background Art

Diesel engines are generally often intended for heavier duty use than, for instance, gasoline engines. Therefore, regarding strength, they are generally overbuilt and moreover, are usually constructed to higher tolerances. This dramatically increases the cost of a diesel engine as opposed to a gasoline engine. Accordingly, it is desirable to enable the owner/operator to recover some of this expense by prolonging the useful life of the engine.

As a result, diesel engines are commonly provided with cylinder liners. The use of cylinder liners can extend engine life by allowing more extensive use of water jackets and coolant passages, thereby providing a cooler running engine. A cooler running engine is further obtained because cylinder liners are generally better heat conductors than the engine block, from which the cylinder walls would otherwise be formed. This is simply because the engine block is formed, for reasons of strength and cost, of cast iron or cast aluminum. In contrast, the cylinder liner need be neither particularly strong nor particularly cheap, and the choice of suitable alloys is therefore not so limited. Accordingly, the liner may be chosen of any appropriate long wearing, heat conductive material. Cylinder liner heat conductivity is still further enabled since the liner may be forged rather than cast, which is not a possibility with the short block.

Cylinder liners are also used in more expensive long-life engines because of their less restrictive maintenance options. In the event that a cylinder wall is badly scored, cracked or chipped, it is often not possible to overbore a block enough to rebuild the engine. This may be because of the lack of availability of the correct size pistons or rings, or simply because of siamesed bore or coolant passage interference. However, it is clear that an otherwise destroyed cylinder liner may simply be replaced.

Additionally, in some engines, it is desirable to coat the cylinder wall with an overlay, or coating in order to reduce friction and further prolong engine life. Even if the cylinder bores of a short block may be overbored, it is often physically difficult to treat or coat those bores afterwards. This is, however, not a problem with removable cylinder liners. Thus, it is seen that not only may the use of cylinder liners per se extend the original life of an engine, but that the liners may themselves be restorable so as to extend the rebuildable life of an engine.

In the past, worn cylinder liners have been restored or reconditioned by simply boring them out as required and utilizing oversize piston rings or, if necessary, oversize pistons. As metallurgy became more sophisticated, a two-step boring and plating procedure came into use. The cylinder was first overbored as required in order to remove any defects in the cylinder wall. In the event that there were no defects in the cylinder wall, the cylinder was still bored in order to provide sufficient piston clearance for the plating step. After boring, the cylinder wall would be scuffed and the liner immersed in an electrolytic bath in order to apply a chromium overlayer. After this two-step procedure became accepted, certain companies began coating the chrome overlayer with a tetrafluoroethylene (TFE) fluorocarbon polymer (known commercially by the trademark "Teflon") surface. Teflon ® is a product of E. I. du Pont de Nemours & Co.

The Teflon ® provides improved cold weather starting and reduces engine wear, in particular, piston ring wear. Ring wear is reduced both (1) because the Teflon ® acts to seal and fill in the microscopically rough hard chrome surface and (2) because of its native dry lubricity. These factors are especially critical during cold engine start up, when the cylinder walls are provided with no, or at best only minimal pressurized lubrication.

It is apparent that these reconditioning procedures may be repeated as each previously renewed cylinder liner becomes worn yet again. After the cylinder liner is repetitively restored, the aggregate thickness of the individual chrome coatings becomes unwieldy and the cylinder wall surface may start to flake, pit or score, reducing engine life to unacceptable levels. Apparently, this results from the relatively rigid chrome layer being applied on the expansive cylinder material and used in an environment with extreme thermal fluctuations.

In order to reduce the aggregate thickness of the chrome layers, certain companies began to apply a steel base underlay before the chrome surface layer was applied. After the chrome surface was applied on top of the steel base, the Teflon finish was optionally applied. Although this procedure results in a nearly optimal cylinder liner finish, the electrolytic application procedure is itself guite costly and it became clear that a less expensive metal deposition procedure which provides the same results would be desirable.

SUMMARY OF THE INVENTION

The present invention provides a novel process for refinishing cylinder liners with fewer procedural steps.

The present invention provides a novel process for refinishing cylinder liners which does not result in an overly thick chrome layer when repeated.

The present invention also provides a novel process for refinishing short block cylinder bores with fewer procedural steps.

The present invention provides a novel process for applying a self lubricating wear resistant coating to new and used cylinder liners and short block cylinder bores.

The present invention also provides short block cylinders and cylinder liners which have a novel self lubricating wear resistant coating.

The present invention provides a novel apparatus for applying a self lubricating wear resistant coating to new and used cylinder liners and short block cylinder bores.

These objects and others are provided by a novel procedure for lining new cylinders or reconditioning used cylinders which comprises applying a bond coating to a clean cylinder wall upon which a steel overcoat is immediately applied. A tetrafluoroethylene fluorocarbon polymer is then applied as a finish coating.

BRIEF DESCRIPTION OF THE DRAWINGS

FIG. 1 is a perspective view of a spray gun apparatus of the present invention entering a cylinder liner.

DETAILED DESCRIPTION OF THE INVENTION

In order to recondition a cylinder liner 2 in accordance with the present invention, the cylinder wall 4 must first be cleaned as necessary for visual inspection. In this regard, it is important to note that a cylinder bore provided in an engine block with integral cylinder walls can be treated in accordance with the present invention. Accordingly, as used herein, "cylinder", "cylinder liner", "liner surface", "cylinder wall" and the like are all intended to include cylinders, cylinder walls and wall surfaces of internal bores integrally defined within an engine block. It is also noted that the various advantages of the present invention may also be provided to new cylinder liners if desired and so the terms "cylinder", "cylinder liner", "cylinder wall", "wall surface" and the like are intended to apply to both used and/or worn out cylinders and cylinder liners in addition to new unused cylinders and cylinder liners.

After cleaning, cylinders walls 4 are measured for severe axial distortion, and examined for cracks, scoring, pitting or other defects which would preclude their usefulness as reconditioned cylinders. Any cylinder 2 which is so marred as to be unusable is discarded. The examination technigues may include conventional procedures including, but not limited to: X-ray, dye penetration, Magnaflux process and the like.

Wherever possible, all cylinders 2 are preferably water tested for leaks arising from defects which did not show up in the previous examination step. This is especially important for cylinders 2 which feature integral water jackets since they typically exhibit increased failure rates. Any cylinders 2 which leak under pressure of course are also discarded. In the event that the cylinder liner wall 4 features ports or other apertures 6, those ports 6 should be sealed or plugged with wood or some other suitable material. This is, of course, most often the case when cylinder 2 is integrally provided within the engine block.

Minor defects within the cylinder walls 4 of used or worn liners 2 are to be cleaned up by the milling or boring of the cylinders 2. The minimum oversize of the bore is about 0.060 inch diameter. The resulting surface of the bore is measured by a profileometer, which indicates the microscopic variance of depth in the bore surface face. It is preferred that the surface exhibit at least a minimum variance for optimal base coat adhesion. The preferred variance is at least 150 mils RMS. Naturally, if the cylinder 2 has not been used in service, there is generally no need to clean up the wall surface 4. Accordingly, if the oversize exceeds the preferred 0.060 inch diameter minimum and the variance exceeds the preferred 150 mils RMS minimum, this step may be skipped.

It is important to ascertain which direction (i.e., clockwise or counter-clockwise) that the cylinder wall 4 is milled in. Alternatively, if a new cylinder 2 having acceptable features is used, it should be noted in which direction it was originally milled. This direction will be reguired as a reference in future steps. The direction may also be referred to as "relative rotation" and describes the left or right-handedness of the microscopic bore spiral, or rifle.

Cylinders 2 which were previously used in service are now baked in order to remove any oils which have penetrated in their somewhat porous iron, steel or alloy cylinder wall 4 subsurfaces. The cylinders 2 are baked for at least about 60 minutes at a temperature of at least 400° F. Since new cylinders 2 do not commonly have oil impregnated surfaces, as with the previous step, this step may be omitted when finishing new cylinders 2.

The cylinder walls 4 are now thoroughly grit blasted, preferably using a #18 angular grit. It is helpful if the apertures 6, if any, are again plugged during this and the forthcoming steps. A useful hardened A18 angular steel grit may be purchased from the Wheelabrator Corporation. The grit blasting step flattens the microscopic peaks in the milled or bored cylinder wall 4 surface. Therefore, the wall 4 surface effectively becomes less abrasive, yet without significantly increasing its smoothness. If the surface variance was originally much more than 150 mils RMS, this step may desirably be repeated.

A bond coat is then applied to the cylinder wall 4 surface. The bond coat material is provided by a bond coat wire 8. The preferred bond coat wire 8 is a bond arc coating No. 208 from the Techalloy Corporation. That wire is 0.060 inch diameter and is 99 weight percent nickel, wherein the balance is both tin and aluminum. A dense homogenous bond coat layer, preferably having a thickness of about 0.005 inch/side (or 0.010 inch/diameter) is applied to the wall 4 surface in a single stroke. As used herein, a single stroke is defined as a complete reciprocation, i.e., a complete pass through one end of the cylinder 2 to the other and back.

The bond coat layer is applied using any appropriate welding or spray apparatus 10. One such apparatus 10, for example, is provided which uses heavy rubber or polymer hoses 12 having a steel core for feeding the bond coat wires 8. Since the wires 8 pass through these hoses 12, it is desirable to coat the steel hose core with Teflon in order reduce the relative coefficient of friction. This allows the wires 8 to slide freely with less interference and obstruction. The hoses 12 lead into a spray gun 14 which is provided with a power drive (unillustrated), preferably by using an air motor. The air motor drives two sets of serrated spring loaded rollers. The rollers are loaded together and are adjustable so as to apply the correct tension necessary to pull the bond coat wires 8 from their spools, through the hoses 12 and into the gun 14.

After a pair of wires 8 are pulled into the spray gun 14, they are respectively directed into a pair of gun extensions 16. The extensions 16 are each formed from one tube section 20, 22. The tubes are preferably copper, having an outer diameter of about 3/16 inch and a throughgoing aperture of about 0.080 inch diameter. The tube sections are substantially parallel and are secured at both ends. A third tube section 24 is also oriented so as to form a triangulated arrangement. The third tube section 24 is an air flow supply tube.

Copper tips 26, 28, 30 are attached to the far ends of the tube sections 20, 22, 24, respectively, which direct the flow of the materials contained therein together at a common intersection point 32. At the intersection 32, of course, the coating wires 8 arc and the wire 8 material is melted. The particular relationship between the angles defined by the various tube section tips 26, 28, 30 is critical. That relationship is satisfied, for example, when the wire feed tips 26, 28 are angled towards each other at about 75°, thus forming a wire intersection angle of about 30°. The relationship is further satisfied in this example by providing the air supply tip 30 with an angle towards the wire feed tips of about 75°–80°. This produces a controlled air stream directly over the arc which has the correct orientation to produce a desirable spray of molten material.

The air supply flow rate is selected based upon the distance from the arc intersection 32 to the tube section tips 26, 28, 30. The closer the distance, of course, the less air flow is required. The distance from the arc intersection 32 to the cylinder wall 4 surface which is being coated is then selected based on the chosen air flow rate so as to obtain the desired spray pattern. An optimal coat layer may be provided, in the given example, at a flow rate of about 80 psi of air at about 150 to 160 amps and 26 to 28 volts.

The spraying operation power supply is a conventional 220 volt single phase DC rectifier having variable amperage and voltage controls. However, it is crucial that the bond coat is applied using substantially clean air which is also substantially free of oil contaminants and so the power supply also provides air which is passed through a filtering device and an oil separator device.

The bond coat spray should be applied using a traversing speed of about 3/16 inch per second while rotating the cylinder 2 relative to the welder 14 at about 80 rpm. The cylinder may be rotated by any conventional rotating device 34. It is not particularly important in what direction the cylinder 2 rotates while the bond coat is being applied. However, all things being considered, it is preferred that the cylinder 2 rotates in the same direction as the reference direction. The reference direction was previously noted as the relative direction of rotation of the cylinder when it was bored. In other words, the bond spray should define the same handed bore spiral.

Immediately following application of the bond coat, the steel coat is applied in the amount of from about 0.015 inch per side (0.030 inch diameter) to 0.020 inch per side (0.040 inch diameter). The steel coating should form a fine homogenous coating and may be provided, for example by any suitable steel arc wire. One such wire is designated L50 from Lincoln Electric Corporation and sold in 0.32 and 0.60 inch diameters. Such wire may conveniently be applied using the same apparatus 10 in the same conditions as the base coat. Therefore, the steel coating may be applied using approximately 80 psi of air at from about 150 to 160 amps and 26 to 28 volts. Additionally, the travelling speed of the lance or gun 14 is preferably be about 3/16 inch per second while the cylinder is rotated at about 80 rpm. As before, this should deposit about 0.005 inch coat per side (0.010 inch diameter) per complete stroke. Thus, it will usually be necessary to complete three or four complete strokes along the cylinder. If the steel coating is applied as larger, more individual deposits, four complete strokes will generally be required in order to obtain a sufficiently smooth coating.

It is crucial to the present invention that the steel coat is applied while the steel spray defines the same handed bore spiral as the reference direction. Such relative rotation appears to best fill in and smooth out microscopic defects in the cylinder wall 4 which are transmitted through the bond coat. Additionally, such relative rotation provides the best adhesion between the steel and the bond coat.

As with the bond coat, it is essential that the steel coating is applied using substantially clean oil-free air. Accordingly, the air supply is also passed through a filter and an oil separator. Alternatively, either or both of the bond and steel coats may be applied using appropriate alternative gasses or mixtures thereof. Such gasses must, of course, still be substantially clean, oil free and relatively inert as used. One such gas is nitrogen, which is more efficient than air when used in the present invention since it greatly reduces the formation of various oxides.

It is extremely desirable, if possible, to provide an exhaust (unillustrated) within the cylinder 2 bore while both the bond and steel coats are being applied. The exhaust system functions so as to thoroughly remove non-attached spray droplets or dust which would otherwise accumulate within the cylinder. Therefore, the exhaust system ensures that the inventive coatings are applied only to clean surfaces. The exhaust system may be provided by any appropriate vacuum device which does not interfere with the coating procedures. Such an exhaust would remove, for example, from about 50 to 75 cubic feet of air per minute.

The wooden blocks are then removed from the ports 6, if any, so as to not disturb the bond and steel coats. The edges of the coat layers at all cylinder apertures (i.e., both ends of the cylinder and all ports) are then radiused and the cylinder 2 is bored so as to ensure that the inside and outside cylinder wall 4 surfaces are concentric. If the process is applied to an engine block without cylinder liners, the boring provides that the cylinder bore centers remain as they were originally. After the boring procedure, it is desired that approximately 0.005 inch per side (0.010 inch diameter) of the steel layer (not including the bond layer) will remain, leaving the bond layer intact and untouched.

After the final boring is accomplished, the cylinder wall 4 is honed using conventional procedures until an acceptable variance is attained. Such a variance is indicated, for example, by a profileometer reading of about 60 to 80 mils RMS. After this honing, once again, both end openings and all ports, if any, are radiused as required.

The entire internal area of the cylinder 2 is then overcoated and impregnated with a suitable Teflon ® to a thickness of about 0.003 to 5.0 mils. A preferred polymer is a black Teflon ® formulation sold by Du Pont as No. 954–203, which includes an "accelerator", or bonding agent. The bonding agent is an additive which is heat activated such that the Teflon is permanently bonded upon cooling.

The liner 2 is then placed into an oven at room or a moderate temperature and the oven temperature is gradually raised to 350° F. The time required to reach 350° F. is not critical. However, after 350° F. is reached, that temperature should be maintained for at least about ten minutes, that combination of temperature and time being sufficient to permanently bond the preferred Teflon, If another Teflon ® formulation is selected, that Teflon ® should, of course, be set and bonded in any appropriate manner.

After the Teflon ® has completely bonded to the cylinder 2, the cylinder wall 4 is polished using a conventional hone head (unillustrated) equipped with stone holders. A synthetic nonabrasive scouring pad is wrapped around the hone head. A preferred scouring pad is sold by the Minnesota Mining and Manufacturing C under the tradename Scotch Brite. Scotch Brite ® is a type A, fine clean material which may be purchased in 8 inch ×30 foot spools and is marketed as safe for Teflon.

The hone head is then inserted into the cylinder and the hone stones expanded in order to apply a light pressure against the cylinder wall. The cylinder is then lightly polished to remove excess Teflon ® polymer for about 3 to 5 minutes. It is acceptable, for example, to polish the cylinder at a rotational speed of about 220 rpm and a reciprocation speed of about ¼ inch per second.

I claim:

1. An internal combustion cylinder having an internal surface with a multilayer coating, said coating comprising;
   a first homogenous bond layer;
   a second homogenous steel layer; and
   an outer surface layer of tetrafluoroethylene fluorocarbon polymer.

2. The internal combustion cylinder of claim 1, wherein the bond layer is provided by substantially pure nickel metal.

3. A method for reconditioning an internal surface of a used internal combustion cylinder, comprising the steps of:
   (a) boring the cylinder in a single rotational direction relative to the cylinder;
   (b) baking the cylinder so as to substantially remove any oil impurities present in the internal cylinder surface;
   (c) blasting the internal cylinder surface with grit;
   (d) applying a homogenous bond coating to said blasted cylinder surface and immediately thereafter;
   (e) applying a homogenous steel coating over said bond coating, while relatively rotating the cylinder in said single rotational direction;
   (f) boring said cylinder;
   (g) applying a tetrafluoroethylene fluorocarbon polymer to said cylinder surface;
   (h) permanently bonding said tetrafluoroethylene fluorocarbon polymer to said cylinder; and
   (i) removing excess tetrafluoroethylene fluorocarbon polymer therefrom.

4. The method of claim 3, including the step of selecting a substantially clean oil free gas in order to apply said bond and steel coatings by spraying.

5. The method of claim 4, including the step of selecting air as said gas.

6. The method of claim 4, including the step of selecting nitrogen as said gas.

7. The method of claim 4, including the step of exhausting gas from the cylinder during the application of said bond and steel coatings.

8. The method of claim 4, including the step of selecting substantially pure nickel as the material for said bond coat.

9. The method of claim 8, including the step of applying said bond coat while relatively rotating the cylinder in said single rotational direction.

10. The product of the process of claim 3.

11. A method for providing a finish on an internal surface of a clean internal combustion cylinder which has been bored in a determined rotational direction, comprising the steps of:
    (a) applying homogenous bond coating to said cylinder surface and immediately thereafter;
    (b) applying a homogenous steel coating over said bond coating, while relatively rotating the cylinder in said rotational direction;
    (c) boring said cylinder;
    (d) applying a tetrafluoroethylene fluorocarbon polymer to said cylinder surface;
    (e) permanently bonding said tetrafluoroethylene fluorocarbon polymer to said cylinder; and
    (f) removing excess tetrafluoroethylene fluorocarbon polymer therefrom.

12. The method of claim 11, including the step of selecting a substantially clean oil free gas in order to apply said bond and steel coatings by spraying.

13. The method of claim 12, including the step of selecting air as said gas.

14. The method of claim 12, including the step of selecting nitrogen as said gas.

15. The method of claim 12, including the step of exhausting gas from the cylinder during the application of said bond and steel coatings.

16. The method of claim 12, including the step of selecting substantially pure nickel as the material for said bond coat.

17. The method of claim 16, including the step of applying said bond coat while relatively rotating the cylinder in said single rotational direction.

18. The product of the process of claim 11.

* * * * *